Patented Aug. 26, 1947

2,426,338

UNITED STATES PATENT OFFICE 2,426,338

ACYLATED AMINES

Charles M. Blair, Jr., Webster Groves, Mo., assignor to Petrolite Corporation, Ltd., Wilmington, Del., a corporation of Delaware No Drawing. Original application December 31, 1943, Serial No. 516,537. Divided and this application September 12, 1945, Serial No. 615,914

11 Claims. (Cl. 260—404)

The present invention relates to a new class of chemical substances and more particularly to new reagents which are useful as lubricating oil additives, rust preventive compounds and for other purposes hereinafter described. This application is a division of application Serial No. 516,537, filed December 31, 1943, which is in turn a continuation-in-part of my co-pending application Serial No. 465,261, filed November 11, 1942, now Patent No. 2,342,114, February 22, 1944.

Briefly, this new class of chemical compounds may be described as consisting of amides or imides derived by reaction between a high molecular weight amine and a polybasic carboxy acid or anhydride of the kind hereinafter described.

The amines contemplated as reactants in preparing the present compounds are primary and secondary aliphatic, aralkyl, alkyl-alicyclic, and alkylheterocyclic amines in which there is present at least one aliphatic residue containing from eight to thirty-two carbon atoms.

The polybasic acids or anhydrides contemplated as reactants for production of this new class of compounds are obtained by the condensation of an alpha-beta ethylenic carboxy acid or anhydried with an unsaturated, non-hydroxylated fatty acid containing from ten to twenty-four carbon atoms in its carbon chain. The desired polybasic acid or anhydride reactants may be prepared by two different types of reaction. One type of reaction involves the condensation of an alpha-beta ethylenic acid or anhydride with a conjugated, unsaturated non-hydroxylated fatty acid. The second type of reaction involves the condensation of an alpha-beta ethylenic acid or anhydride with a non-conjugated, unsaturated, non-hydroxylated fatty acid.

It is well known that maleic anhydride and other alpha-beta ethylenic acids or anhydrides will condense with conjugated, unsaturated fatty acids in accordance with Thiele's theory of 1–4 addition. The fatty acid in this case, of course, must contain at least two carbon-to-carbon double bonds and these must be conjugated. This type of reaction has been thoroughly studied by Diels and coworkers, and is often referred to as the Diels diene synthesis. The products are often called diene synthesis adducts.

Examples of suitable fatty acids which will take part in a Diels condensation include: Geranic acid, elaeostearic acid, 10,12-octadecadienoic acid, tung oil fatty acids, etc. Actually the esters of these acids, such as the triglycerides or the esters of mono-, di-, or other polyhydric alcohols may be employed in this condensation in place of the fatty acid itself. Examples of suitable esters include: methyl-10,12-octadecadienoate, glycoldielaeostearate, oiticaca oil, tung oil, dehydrated, conjugated castor oil, ethyl dehydrogeranate and the like.

The alpha-beta ethylenic carboxy acids or anhydrides which are suitable for use in the aforementioned Diels diene synthesis for preparation of the present products are those containing less than ten carbon atoms and are exemplified by crotonic acid, maleic acid, fumaric acid, citraconic acid, glutaconic acid, acrylic acid, maleic anhydride, and citraconic anhydride.

Polybasic acids or anhydrides contemplated as reactants for production of this new class of compounds are also obtained by the condensation of an alpha-beta ethylenic acid, or anhydride with an unsaturated, non-conjugated, non-hydroxylated fatty acid containing from ten to twenty-four carbon atoms in the carbon chain. It has recently been shown by Clocker, U. S. Patents 2,188,882 to 2,188,892 inclusive, and Bickford et al., Oil & Soap, Feb., 1942, page 23 et seq., that such condensations may be brought about by heating the reactants at a suitably elevated temperature, usually above 200° C. and sometimes at temperatures above 300° C. The products formed are also acids or anhydrides, since the reaction appears not to involve the destruction of these groups. The alpha-beta ethylenic acids or anhydrides which are suitable for use in the aforementioned condensation with non-conjugated, unsaturated, non-hydroxylated fatty acids are those containing less than ten carbon atoms and are exemplified by crotonic acid, maleic acid, fumaric acid, citraconic acid, glutaconic acid, acrylic acid, maleic anhydride and citraconic anhydride.

Suitable non-conjugated, unsaturated, non-hydroxylated fatty acids for use in condensation reactions with the above-mentioned alpha-beta ethylenic acids are those containing from ten to twenty-four carbon atoms in their carbon chains, and include undecylenic acid, oleic acid, elaidic acid, linoleic acid, linolenic acid, etc.

Actually, as pointed out by Clocker in the above-mentioned patents, the esters of these acids, such as the triglycerides or the esters of mono- or di- or other poly-hydric alcohols may be employed in this condensation in place of the fatty acid itself. In the present specification and in the claims, the term "non-conjugated, unsaturated, non-hydroxylated fatty acids" is intended to include the esters of such acids with mono-, di-, or polyhydric alcohols. For the production of the present compositions using as one reactant the above described condensation compounds of Clocker, I usually prefer to employ a condensation product derived from a glyceride containing, in esterified form, a large proportion of non-conjugated, unsaturated, non-hydroxylated fatty acid. Examples of such glycerides are olive oil, corn oil, cottonseed oil, linseed oil, soybean oil, rapeseed oil, perilla oil, cranberry seed oil, menhaden oil, cod oil, whale oil, heat bodied linseed oil, etc.

When glycerides or other esters of the non-conjugated, unsaturated, non-hydroxylated fatty acids are employed in the condensation reaction, the final product is not necessarily a polybasic acid or anhydride, since a monocarboxy, alpha-beta ethylenic acid, such as crotonic acid, may have been employed in the condensation. However, such monobasic acid condensation products are contemplated as reactants in preparing my new compositions. Actually they are the partial esters of dibasic acids and under certain conditions may function as polybasic acids by interchange of the alcohol residue with a hydroxyl-containing reactant.

As previously stated, my new compositions may be prepared by condensing a diene synthesis adduct or a Clocker adduct and a high molecular weight amine. The amines used are primary or secondary and must contain at least one aliphatic residue of eight to thirty-two carbon atoms in size, but in addition may contain other hydrocarbon groups or residues such as aromatic rings, alicyclic rings, or heterocyclic rings in which the amino nitrogen is a part of the ring. The amino group may be attached either to the aliphatic residue or to the non-alkyl portion of the molecule, but, of course, must be capable of forming an amide or imide by reaction with the Clocker adduct. These amines may be either straight or branch chained and may be either primary or secondary. Examples of suitable amine reactants include the following: n-octyl amine, 2-ethyl hexylamine, lauryl amine, hexadecyl amine, octadecyl amine, docosylamine, para-iso-octyl aniline, dodecyl amine, dioctadecylamine, methyl octadecyl amine, dodecyl aniline, decylcyclohexyl-amine, amines obtained by reduction of nitriles from fatty acids, naphthenic acids and synthetic acids derived by oxidation of high boiling petroleum fractions, etc.

Other suitable means include the olefinic amines containing from eight to thirty-two carbon atoms and amines containing the olefinic residue of from eight to thirty-two carbon atoms. The presence of a double bond in the hydrocarbon chain does not appear to alter the usefulness or effectiveness of the amide products. Suitable olefinic amines include oleyl amine, undecenyl amine, hexadecenyl amine, eicosenyl amine, dioctadecenyl amine, methyl hexadecenyl amine, and the like.

In the examples it will be clear whether the adduct reactant employed is of the diene synthesis type or the Clocker type. A mixture of the two may be employed, if desired.

In carrying out the synthesis of the present class of compounds, it is usually most convenient to prepare the desired adduct of the unsaturated fatty acid and an alpha-beta ethylenic acid, after which the desired high molecular weight amine is added and reacted by heating and stirring. It is not necessary that all of the carboxyls or potential (anhydride) carboxyls of the adduct be condensed with high molecular weight amines, and, as will be discussed hereinafter, some carboxyls will often be left unreacted.

The following examples illustrate the preparation of some of the present products:

EXAMPLE 1

A diene synthesis adduct was first prepared by refluxing for four hours a mixture of 150 lbs. of tung oil acids, 50 lbs. of maleic anhydride, 100 lbs. of benzol, and about 0.1 lb. of iodine.

To the above adduct in benzol was added 184 lbs. of dodecylamine and refluxing was continued with a water trap under the condenser. After two hours refluxing, the benzol and water of reaction were slowly distilled off, leaving a viscous reddish oil.

EXAMPLE 2

Tung oil was substituted for the tung oil acids in Example 1. The product in this case was quite soluble in kerosene and lubricating oil.

EXAMPLE 3

42 lbs. of crotonic acid were substituted for the 50 lbs. of maleic anhydride in Example 2, and only 92 lbs. of dodecylamine were employed in the amidification step.

EXAMPLE 4

A Clocker adduct was prepared by heating and stirring under a condenser a mixture of 300 lbs. of linseed oil and 200 lbs. of citraconic anhydride. The temperature of this mixture was slowly raised to 230° C. and held at this point for two and one-half hours.

50 lbs. of the above adduct was heated and stirred in an open vessel with 50 lbs. of hexadecylamine. The temperature was raised to 240° C. and held for forty-five minutes. The final product was a viscous oil.

EXAMPLE 5

Maleic anhydride was substituted for the citraconic anhydride of Example 4.

EXAMPLE 6

Methyl linolenate was substituted for the linseed oil of Example 4.

EXAMPLE 7

300 lbs. of soyabean oil and 100 lbs. of maleic anhydride were heated with stirring under a condenser. The temperature was gradually raised to 240° C. and held at this point for three hours.

50 lbs. of the above adduct and 35 lbs. of octadecenylamine were heated and stirred in a reaction kettle for one hour at a temperature of 250° C. The product was a viscous oil.

EXAMPLE 8

Octylcyclohexylamine was substituted for octadecenylamine in Example 7.

EXAMPLE 9

500 lbs. of the Clocker adduct of Example 4 was reacted with 1042 lbs. of dioctadecyl amine by heating and stirring for two hours after raising the temperature to 240° C.

EXAMPLE 10

37 lbs. of dodecylamine was substituted for the hexadecylamine of Example 4.

EXAMPLE 11

27 lbs. of octadecylamine was substituted for the hexadecylamine of Example 4.

For the preparation of rust preventive compounds various products of the above examples may be used directly as such for application to the metal to be protected, or may be mixed with a suitable solvent or carrying agent for application as a slushing oil or grease. These products may be used alone or in mixtures with other rust preventive agents. Examples of a few such rust preventive compositions are given below.

RUST PREVENTIVE COMPOUNDS

Example A

The following reagents were mixed with slight warming until homogeneous:

|  | Pounds |
| --- | --- |
| Product of Example 1 | 100 |
| Viscous lubricating oil (6000 S. U. S. @ 100° F.) | 200 |
| Kerosene | 700 |

Example B

The following were blended as in Example A, and the resulting mixture was filtered to remove a small amount of undissolved impurities:

|  | Pounds |
| --- | --- |
| Product of Example 4 | 100 |
| Mineral pitch | 50 |
| Heavy blown rapeseed oil | 25 |
| Mineral spirits | 600 |

Example C 35 lbs. of oil soluble petroleum sulfonate were added to the mixture of Example B.

Example D

The following were treated as in Example B:

|  | Pounds |
| --- | --- |
| Product of Example 10 | 125 |
| Viscous lubricating oil | 250 |
| Carbon tetrachloride | 625 |

Example E

The following were treated as in Example B:

|  | Pounds |
| --- | --- |
| Product of Example 11 | 125 |
| Cyclohexylamine | 5 |
| Blown rapeseed oil | 25 |
| Kerosene | 500 |

Example F

The product of Example 9 was substituted for the product of Example 10 in Example D.

The above products are thin, rust-preventive oils suitable for dipping, brushing or spraying.

Heavy, grease-like rust preventives may be prepared by blending the present compounds with petrolatum or mixtures of petrolatum and other ingredients such as natural or synthetic resins.

In some of the examples given above, less amine has been used in the reaction than corresponds to all of the carboxyls or potential carboxyls present in the adduct. In such cases the product may contain free carboxyl groups. Where a primary amine is reacted with an adduct containing two carboxylic acid groups which are attached to closely adjacent carbon atoms, the product appears to contain appreciable amounts of an imide, as well as some amide. Where a secondary amine is employed, imide formation is, of course, impossible under ordinary conditions. Adducts prepared from maleic anhydride, citraconic anhydride, fumaric acid and other polycarboxylic, alpha-beta unsaturated acids in which two carboxyl groups are separated by only two carbon atoms appear to be most capable of yielding imides when reacted with primary amines.

An imide may be looked upon as a special kind of amide, one in which two, instead of one, of the amino hydrogens have been removed by an acylation reaction. My invention contemplates the products obtained by acylation reaction between the diene adduct or Clocker adduct and the amines of the kind described, whether such acylation results in the removal of one or two amino hydrogen atoms. In general, reactions involving primary amines will contain at least some of each type of acylation product.

Any unreacted carboxylic acid or anhydride groups remaining in the product may be left as such or may be neutralized with ammonia, amines, or inorganic bases, in which case the acidic hydrogen of the carboxyl is replaced with an ammonium, amino, or metal ion. Example E above illustrates the use of an amine for neutralizing part of the carboxyl group of the adduct amide. In many instances it is unnecessary to neutralize all such free carboxyl groups and for certain uses this may be undesirable. Oftentimes where a rust preventive compound is to be applied in aqueous solution it is desirable to neutralize the carboxyl group of the acidic adduct amine with inorganic base, ammonia, or low molecular weight amines, in order to impart water solubility or water dispersibility on the reagent. As pointed out in my above-mentioned Patent No. 2,342,114, the present compositions have uses in various other arts and are claimed particularly therein as additives for lubricating oils.

Products having detergent and sludge dispersing properties may be prepared, for example, by treating the product of Example 9 with calcium hydroxide, to neutralize free carboxy acid groups, heating to complete the reaction and drive off water, dissolving in ligroin, filtering to remove unused calcium hydroxide, and evaporating ligroin from the filtrate.

Similar products may be prepared from the compounds of the other examples where free anhydride or carboxyl groups are preesnt.

If desired, residual carboxy acid groups may be esterified with low molecular weight alcohols to yield products with improved oil solubility.

Residual carboxy acid groups may be reacted with phenols, for example, phenol, catechol, pyrogallol, etc., to yield products with antioxidant properties. Amino phenols such as para-amino phenol or ortho-amino phenol may be used either to neutralize carboxyls or to esterify or amidify them, thus giving compounds of improved antioxidant properties.

Recapitulating, the acidic hydrogens which may remain in the present class of chemical reagents may be left as such or may be replaced by any equivalent. Such acidic products may be treated with a suitable alkaline material such as caustic soda, caustic potash, ammonium hydroxide, calcium hydroxide, magnesium hydroxide, etc., to form the corresponding metallic salts, or with amines such as amylamine, cyclohexylamine, triethanolamine, para amino phenol, etc., to form the amine salts. The acidic hydrogen may be replaced by a lower alcohol residue derived from alcohols such as ethanol, butanol, hexanol, cyclohexanol, phenol, catechol, etc., to form an ester.

Amino alcohols such as the ethanolamines, glyceryl amines, etc., may be employed to replace an acidic hydrogen either by esterification or salt formation.

The present reagents may also be used as break inducers in the doctor sweetening process and for such use may be applied as described in U. S. Patent 2,208,505, to Blair and Boydstun.

Certain of the present compounds also have detergent and sludge dispersing properties and when used in lubricating oil are effective in preventing sludge and varnish deposition in engines. In general, the present products have the property of inhibiting or greatly lessening the corrosion of ferrous metals when applied to such metals directly or in the form of solutions in oils or greases.

Others of these reagents have the property of increasing the oiliness or load-bearing capacity of oils; and still others have antioxidant properties.

It will be obvious to most chemists that various derivatives of the present products may be prepared which will have similar properties. For example, many of the present products contain carbon-to-carbon double bonds, either in the fatty acid or amine residue chain, and may be readily sulfurized by heating with sulfur. Such sulfurized derivatives, in some instances, have valuable properties over and above the original unsulfurized product. For example, they usually are better antioxidants and have greater film strength as lubricants.

Other obvious derivatives include those derivable by oxidation, as by blowing with air or oxygen at elevated temperatures, and polymerized products derivable by reacting carboxyl or anhydride containing compositions with polyhydric alcohols or polyamines.

Having described my invention, I claim:

1. An acylated mono-amine in which the amine radical is that of an amine selected from the group consisting of primary and secondary aliphatic, aralkyl, and alkyl-alicyclic amines having at least one aliphatic hydrocarbon radical containing from 8 to 32 carbon atoms, and in which the acyl radical is that of an acidic adduct of an acyclic alpha-beta ethylenic acid having not more than 10 carbon atoms and a member of the group consisting of acids and esters of unsaturated, non-hydroxylated fatty acids, the acyl radical of which contains 8 to 32 carbon atoms, said acidic adduct being further characterized in that the acyclic alpha-beta ethylenic acid is combined at an intermediate point of the carbon atom chain of the unsaturated non-hydroxylated fatty acid acyl radical.

2. The acylated mono-amine of claim 1, wherein said member of the group of acids and esters is polyethylenic.

3. The acylated mono-amine of claim 1 wherein said member of the group of acids and esters is polyethylenic and contains a fatty acid radical of 18 carbon atoms.

4. The acylated mono-amine of claim 1 wherein said member of the group of acids and esters is polyethylenic and contains a vegetable fatty acid radical of 18 carbon atoms.

5. The acylated mono-amine of claim 1 wherein said member of the group of acids and esters is polyethylenic and contains a vegetable fatty acid radical of 18 carbon atoms, the amine radical of the acylated mono-amine being aliphatic.

6. The acylated mono-amine of claim 1 wherein said member of the group of acids and esters is polyethylenic and contains a vegetable fatty acid radical of 18 carbon atoms, the amine radical of the acylated mono-amine being aliphatic and completely saturated.

7. The acylated mono-amine of claim 1 wherein said member of the group of acids and esters is polyethylenic and contains a vegetable fatty acid radical of 18 carbon atoms, the amine radical of the acylated mono-amine being a hexadecyl amine radical.

8. The acylated mono-amine of claim 1 wherein said member of the group of acids and esters is polyethylenic and contains a vegetable fatty acid radical of 18 carbon atoms, the amine radical of the acylated mono-amine being a dioctadecyl amine radical.

9. The acylated mono-amine of claim 1 wherein said member of the group of acids and esters is polyethylenic and contains a vegetable fatty acid radical of 18 carbon atoms, the amine radical of the acylated mono-amine being a dodecyl amine radical.

10. The acylated mono-amine of claim 1 further characterized in that the amine radical thereof is aliphatic.

11. The acylated mono-amine of claim 1 further characterized in that the amine radical thereof is aliphatic and completely saturated.

CHARLES M. BLAIR, JR.

REFERENCES CITED

The following references are of record in the file of this patent:

UNITED STATES PATENTS

| Number | Name | Date |
|---|---|---|
| 2,342,114 | Blair | Feb. 22, 1944 |